US012674492B2

(12) United States Patent
Acharya et al.

(10) Patent No.: US 12,674,492 B2
(45) Date of Patent: Jul. 7, 2026

(54) ELECTROMECHANICAL ACTUATOR ASSEMBLY WITH MECHANICAL OVERRIDE FEATURE

(71) Applicant: B/E Aerospace, Inc., Winston-Salem, NC (US)

(72) Inventors: Pradeep Acharya, Bangalore (IN); Stephen Harlow Davies, Shrewsbury (GB); Sreekanth Rao, Bangalore (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 19/235,331

(22) Filed: Jun. 11, 2025

(65) Prior Publication Data

US 2026/0009430 A1      Jan. 8, 2026

(30) Foreign Application Priority Data

Jul. 2, 2024    (IN) .............................. 202441050698

(51) Int. Cl.
| | |
|---|---|
| *F16D 11/08* | (2006.01) |
| *B64D 11/06* | (2006.01) |
| *B64D 25/00* | (2006.01) |
| *F16D 125/48* | (2012.01) |
| *F16D 125/58* | (2012.01) |
| *F16D 129/04* | (2012.01) |

(52) U.S. Cl.
CPC ........ *F16D 11/08* (2013.01); *B64D 11/06395* (2014.12); *B64D 11/064* (2014.12); *B64D 25/00* (2013.01); *F16D 2125/48* (2013.01); *F16D 2125/582* (2013.01); *F16D 2129/04* (2013.01)

(58) Field of Classification Search
CPC ................ F16D 11/08; F16D 2125/48; F16D 2125/582; F16D 2129/04; B64D 11/06395; B64D 11/064; B64D 25/00
See application file for complete search history.

(56) References Cited

U.S. PATENT DOCUMENTS

| | | | |
|---|---|---|---|
| 5,088,341 | A | 2/1992 | Hyde et al. |
| 8,899,635 | B2 | 12/2014 | Nakanishi et al. |
| 9,187,126 | B2 | 11/2015 | Kawauchi et al. |
| 9,863,745 | B2 | 1/2018 | DeHart |
| 2016/0052424 | A1* | 2/2016 | Ferguson ......... B64D 11/06395 74/89.22 |
| 2021/0246950 | A1* | 8/2021 | Pawley ................. F16D 27/004 |
| 2022/0089288 | A1* | 3/2022 | Warren .................. B60N 2/062 |
| 2022/0381342 | A1 | 12/2022 | Magazinnik |
| 2024/0035532 | A1* | 2/2024 | Bahmata ............... F16D 65/568 |

* cited by examiner

*Primary Examiner* — Rodney A Bonnette
(74) *Attorney, Agent, or Firm* — Suiter Swantz IP

(57) ABSTRACT

An electromechanical actuator assembly (EMA) for use with a reclinable passenger seat. The EMA includes a housing, an electric motor, and an epicyclic gearbox including first and second ring gears. In the event of power loss, the second ring gear can be decoupled from the first ring gear to permit relative rotation, for instance to manually return the reclined seat to upright, by a mechanical override mechanism including first and second spring-loaded shoot bolts coupled to the first ring gear, a displaceable plate engaging one end of the first and second spring-loaded shoot bolts, and a manual release pin coupled to the displaceable plate. In use, the manual release pin is moveable axially to a position in which the displaceable plate displaces toward the first ring gear to decouple the first and second ring gears.

20 Claims, 7 Drawing Sheets

ELECTROMECHANICAL ACTUATOR ASSEMBLY WITH MECHANICAL OVERRIDE FEATURE

CROSS REFERENCE TO RELATED APPLICATION

This application claims the benefit of priority of Indian Provisional Application No. 202441050698 filed Jul. 2, 2024 for ELECTROMECHANICAL ACTUATOR ASSEMBLY WITH MECHANICAL OVERRIDE FEATURE, which is hereby incorporated by reference in its entirety.

TECHNICAL FIELD AND BACKGROUND

The present disclosure relates generally to an electromechanical actuator assembly (EMA) including a mechanical override feature, and more particularly, to an EMA including a mechanical override mechanism for rotationally decoupling ring gears to permit relative rotation, for instance, to return a reclined seat to an upright sitting position in the event of power loss.

Passenger seats such as business class passenger seats may be equipped with EMAs for driving seat component motions. Traditional EMAs may be coupled to gearboxes including, for example, epicyclic gear trains and ring gears. In some applications, epicyclic gear trains may be used to drive seat back rotation between an upright sitting position and a reclined sitting position.

During normal use, an electric motor is operated to drive a driven shaft in opposite directions to thereby drive gears opposite directions, wherein the directions correspond to, for example, recline motion of a seat back and return to upright motion of the seat back. In the event of power loss, the electric motor is incapable of driving the gears and thus the seat may be locked in a certain position. Federal aviation safety requirements require that passenger seats be positioned in a compliant upright sitting position in preparation for taxi, takeoff, and landing (TTOL). Therefore, a passenger seat locked in a reclined sitting position will not meet the requirements for TTOL and therefore may be considered unsafe.

Accordingly, what is needed is a mechanical override feature for an EMA that allows for manual component positioning to achieve compliance in the event of a power loss.

BRIEF SUMMARY

According to one aspect, the inventive concepts according to the present disclosure are directed to an electromechanical actuator assembly (EMA) including a housing, an electric motor including a rotating drive shaft, an epicycle gearbox including first and second ring gears, and a mechanical override mechanism. In embodiments, the mechanical override mechanism includes first and second spring-loaded shoot bolts disposed in the housing and coupled to the first ring gear, a displaceable plate disposed in the housing and engaging one end of each of the first and second spring-loaded shoot bolts, and a manual release pin coupled to the displaceable plate. In use during a powered condition of the EMA, the manual release pin is positioned in a first position such that each of the first and second spring-loaded shoot bolts are further coupled to the second ring gear such that the first and second spring-loaded shoot bolts rotationally lock together the first and second ring gears. During a power loss condition of the EMA, the manual release pin is moveable to a second position in which the displaceable plate displaces toward the first ring gear to simultaneously displace the first and second spring-loaded shoot bolts toward the first ring gear to decouple the first and second ring gears to permit the second ring gear to be rotated manually relative to the first ring gear.

In some embodiments, each of the first and second spring-loaded shoot bolts includes a shoot bolt housing including a first end engaging the displaceable plate and a second end that is open, a compression spring having a first end disposed in the second end of the shoot bolt housing, and a spring cup having an open end receiving a second end of the compression spring.

In some embodiments, the spring cup is engaged with the first ring gear.

In some embodiments, during the powered condition of the EMA the compression spring extends to position the shoot bolt housing into engagement with the second gear ring, and during the power loss condition of the EMA the displacement of the displaceable plate causes the compression spring to be compressed to axially displace the shoot bolt housing toward the first ring gear and out of engagement with the second ring gear.

In some embodiments, each of the first and second ring gears are scalloped gears, and the first and second spring-loaded shoot bolts, during the powered condition of the EMA, are relatively positioned to engage a single scallop or two adjacent scallops of the second ring gear.

In some embodiments, the first position of the manual release pin corresponds to a locked position in which the first and second ring gears are coupled, and the second position of the manual release pin corresponds to an unlocked position in which the second ring gear is rotatable relative to the first ring gear.

In some embodiments, the EMA is for use with an aircraft passenger seat wherein the EMA is operable to move a seat back between an upright sitting position and a reclined position, during the powered condition the electric motor is operable to move the seat back between the upright and reclined sitting positions through the coupling of the first and second ring gears, and during the power loss condition the manual release pin is configured to be moved to the second position to allow the seat back to be moved from the reclined sitting position to the upright sitting position by way of the decoupling of the second ring gear from the first ring gear.

In some embodiments, the manual release pin is coupled to a lever position on the aircraft passenger seat.

In some embodiments, the manual release pin is displaceable between the first position and the second position in an axial direction of the manual release pin, and the displaceable plate is attached to one end of the manual release pin.

According to another aspect, the inventive concepts according to the present disclosure are directed to an aircraft passenger seat assembly including a seat bottom, a seat back, and the EMA configured to adjust the seat back between an upright sitting position and a reclined position.

In some embodiments, during the powered condition of the EMA the compression spring extends to position the shoot bolt housing into engagement with the second gear ring, and during the power loss condition of the EMA the displacement of the displaceable plate causes the compression spring to be compressed to axially displace the shoot bolt housing toward the first ring gear and out of engagement with the second ring gear.

In some embodiments, the manual release pin is coupled to a lever position on one of the seat back and the seat bottom.

According to a further aspect, the inventive concepts according to the present disclosure are directed to a mechanism for releasing a coupling between a first ring gear and a second ring gear. In embodiments, the mechanism includes at least one spring-loaded shoot bolt including a spring cup coupled to the first rotating gear, a shoot bolt housing coupled to the second rotating gear, and a compression spring having a first end engaged in the spring cup and a second end engaged in the shoot bolt housing, a displaceable plate engaging an end of the shoot bolt housing opposite the spring cup, and a displaceable pin mounted to the displaceable plate. In use, movement of the displaceable pin in a direction of the first ring gear causes the displaceable plate to displace the shoot bolt housing thereby causing the compression spring to compress and the shoot bolt housing to move out of coupling with the second gear thereby allowing the second gear to rotate relative to the first gear.

In some embodiments, each of the first ring gear and the second ring gear is circumferentially scalloped, the spring cup engages between scalloped portions of the first gear, and the shoot bolt housing engages between scalloped portions of the second gear.

In some embodiments, the mechanism includes two adjacent spring-loaded shoot bolts.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
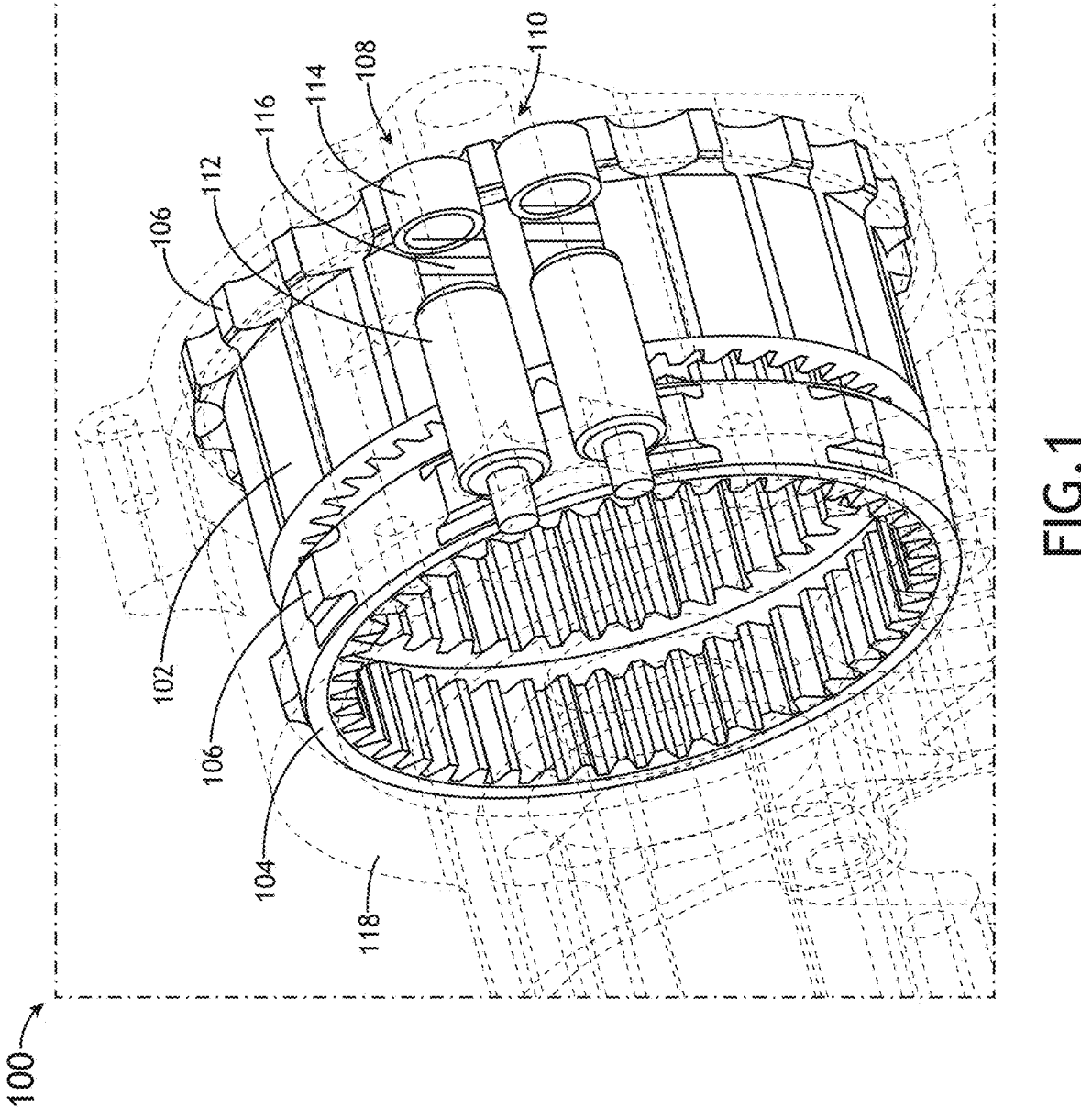
FIG. 1 is an isometric view of a ring gear portion of an electromechanical actuator assembly (EMA) including a manual override feature, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to an electromechanical actuator assembly (EMA) including a mechanical override mechanism. In the event of power loss, motor failure or other malfunction at the driving end of the EMA, the mechanical override mechanism may be actuated manually by an external physical input to decouple ordinarily coupled gears, such as ring gears. During normal use in which the EMA is powered and operating properly, the mechanical override mechanism operates to maintain coupling between the gears to prevent relative rotation.

In a particular conceived example, the EMA may be incorporated in a passenger seat such as an aircraft passenger seat to control seat adjustability between an upright sitting position in preparation for TTOL, and a reclined position during flight. In the event of power loss or malfunction, assuming the passenger seat is reclined, the mechanical override mechanism may be actuated to decouple the coupled ring gears of an epicyclic gearbox rotationally coupled to the EMA, to allow the seat to be moved manually to the compliant TTOL upright sitting position. Once returned to the upright sitting position, the mechanical override mechanism may be released to reengage the coupling of the two ring gears to maintain the seat upright. In the case of an aircraft passenger seat, the mechanical override mechanism may be coupled to a lever positioned on the seat for use by the flight crew. Thus, when implemented in an aircraft passenger seat, the mechanical override mechanism satisfies the requirement for a mechanical override function.

FIG. 1 illustrates components and positional relationships of an EMA 100 according to the present disclosure. The EMA 100 generally includes an epicyclic gearbox including a first gear 102 and a second gear 104 disposed in a housing 118. In a particular example, the first gear 102 may be a stage 1-2 ring gear and the second gear 104 may be a stage 3 ring gear. The first and second gears 102, 104 are coupled such that the second gear 104 is prevented from rotating relative to the first gear 102. In the case of an aircraft passenger seat, the epicyclic gearbox may be used to drive rotation of a movable seat component such as a seat back.

Each of the first and second gears 102, 104 may be a scalloped gear having a plurality of equally spaced circumferential scallops 106. First and second spring-loaded shoot bolts 108, 110 engage the first and second gears 102, 104 to provide a coupling. Each spring-loaded shoot bolt generally includes a shoot bolt housing 112, a spring cup 114, and a compression spring 116 having a first end received in the shoot bolt housing 112 and a second end received in the spring cup 114. The compression spring 116 operates to axially bias the shoot bolt housing 112 away from the spring cup 114. As shown, the spring cups 114 of the two spring-loaded shoot bolts 108, 110 engage adjacent scallops 106 on the first gear 102 such that the spring-loaded shoot bolts 108, 110 are coupled to the first gear 102.

During normal use of the EMA corresponding to a powered condition in which the EMA is operating properly, the compression springs 116 bias the shoot bolt housings 112 into engagement with the second gear 104. More specifically, barrel portions of the shoot bolt housings 112 engage at least one scallop 106 on the second gear to couple the first and second gears 102, 104, such that relative rotation between the two gears 102, 104 is prevented. The coupled condition is also referred to herein as the "locked" condition. Thus, during normal powdered operation, the spring-loaded shoot bolts provide a connecting link between the two gears 102, 104. As discussed in detail below, during a power loss or other malfunction event, the shoot bolt housings 112 may be displaced toward their respective spring cup 114 against the force of the compression springs 116 to disengage the shoot bolt housings 112 from the second gear 104 thereby decoupling the first and second gears 102, 104. The uncoupled condition is also referred to herein as the "unlocked" condition. In this configuration, when the mechanical override is released, the compression springs 116 guarantee automatic reengagement and locking.

Figure 2:
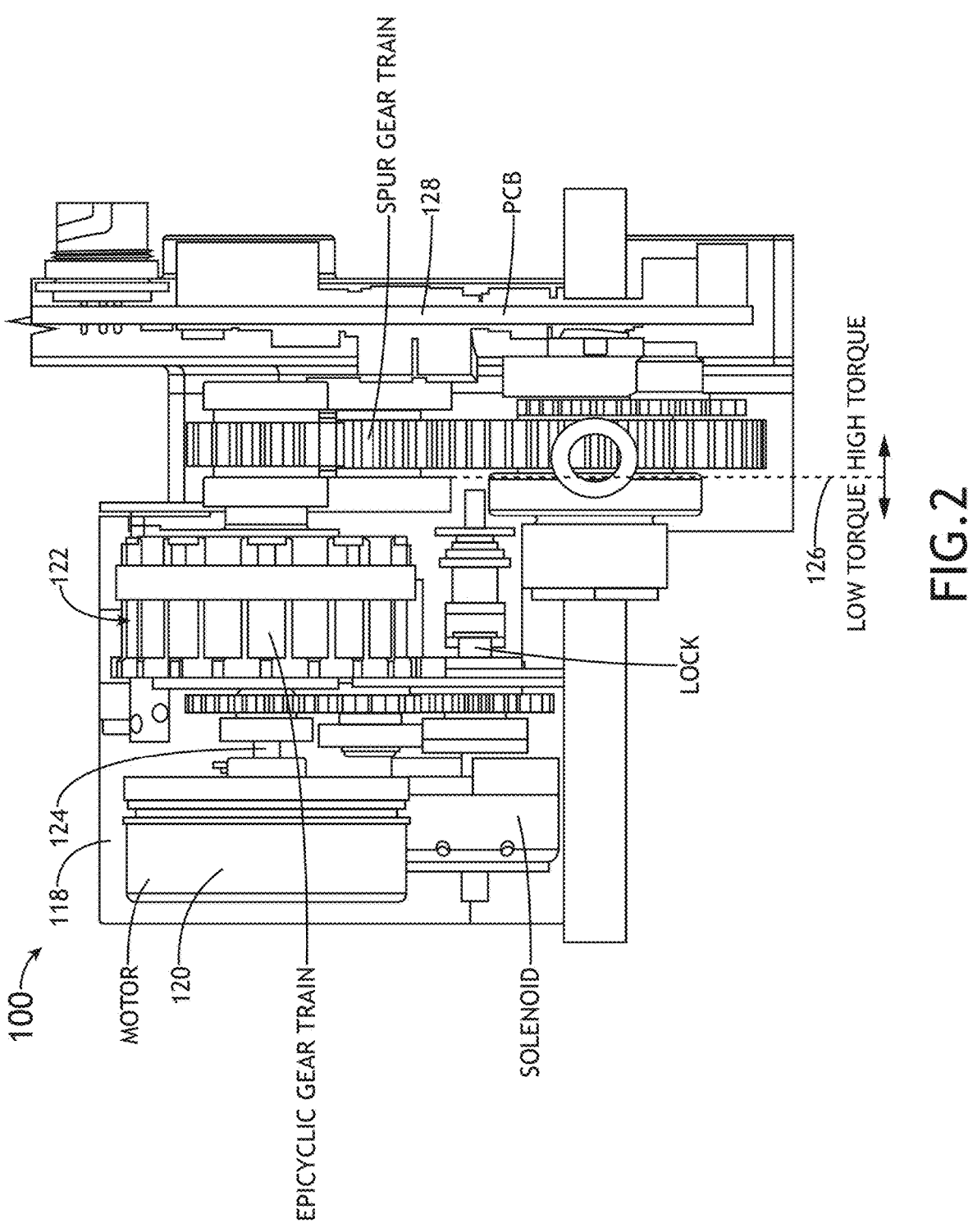
FIG. 2 is a cutaway view of the EMA, in accordance with example embodiments of this disclosure.

FIG. 2 illustrates a non-limiting example of an EMA 100 generally including a housing 118, an electric motor 120 mounted to the housing 118, at least one epicyclic gearbox 122 mounted in the housing 118, and a drive shaft 124. The particular configuration of the at least one epicyclic gearbox 122 is not critical and may vary. In use, the electric motor 120 operates to drive the shaft 124 to rotate gears of the gearbox. As shown, in a non-limiting example, the EMA 100 includes an epicyclic gearbox coupled to the motor shaft on a low torque side of the EMA 100, and a spur gearbox coupled to the shaft on a high torque side of the EMA 100. As shown, reference line 126 shows the demarcation between the low torque side on the left, and the high torque side on the right as shown in the drawing. A printed circuit board 128 controls the EMA 100. Gear types in the EMA 100 may include, but are not limited to, spur gears (e.g., hubbed or hubless), bevel gears, single gears, double gears, etc., each having cut teeth that are meshed with another toothed gear or component to transmit rotational power.

Figures 3A, 3B:
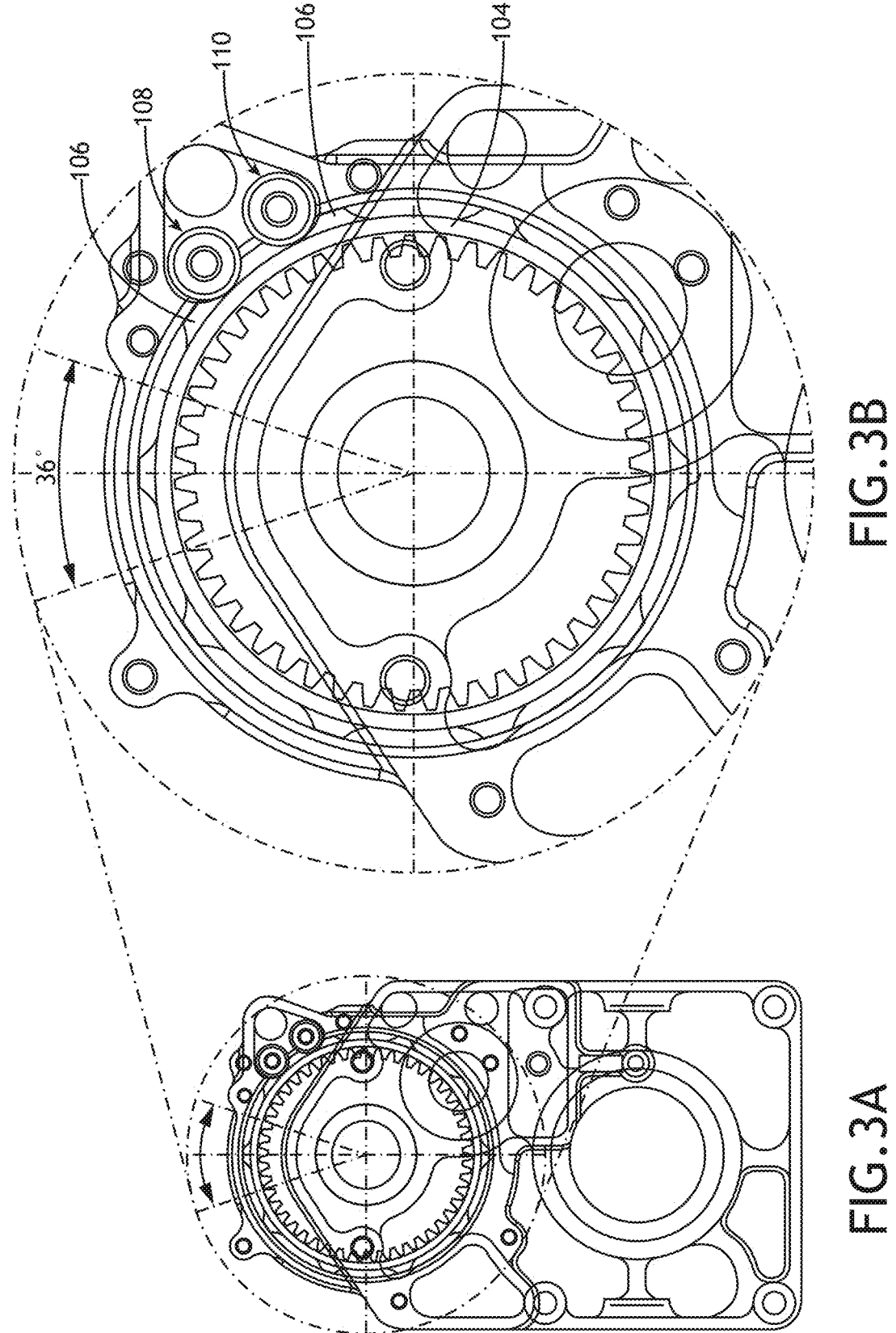
FIG. 3A is a side view of the ring gear portion of the EMA showing the mechanical override feature, in accordance with example embodiments of this disclosure.
FIG. 3B is an enlarged view of FIG. 3A, in accordance with example embodiments of this disclosure.

FIGS. 3A and 3B illustrate the engagement of the two spring-loaded shoot bolts 108, 110 with the second gear 104. As shown, in a non-limiting example, the second gear includes ten equally spaced scallops 106. The shape and diameter (e.g., 6 mm) of the shoot bolt housings 112 matches the scallop shape to provide a matching interface, and the spacing between the two shoot bolt housings 112 ensures that each shoot bolt housing 112 engages one of the scallops 106 and both shoot bolt housings 112 simultaneously engage either between two adjacent scallops 106 as shown in FIG. 3B, or on opposite sides of a single scallop as shown in FIG. 6B. This configuration ensures that both spring-loaded shoot bolts will always reengage with the scallop(s) on the second gear 104 during normal (e.g., powered) use of the EMA such that the two gears are coupled. As the scallop configuration of at least the second gear 104 is changed, the shape and spacing of the two spring-loaded shoot bolts may be changed to match to ensure simultaneous engagement.

Figures 4A, 4B:
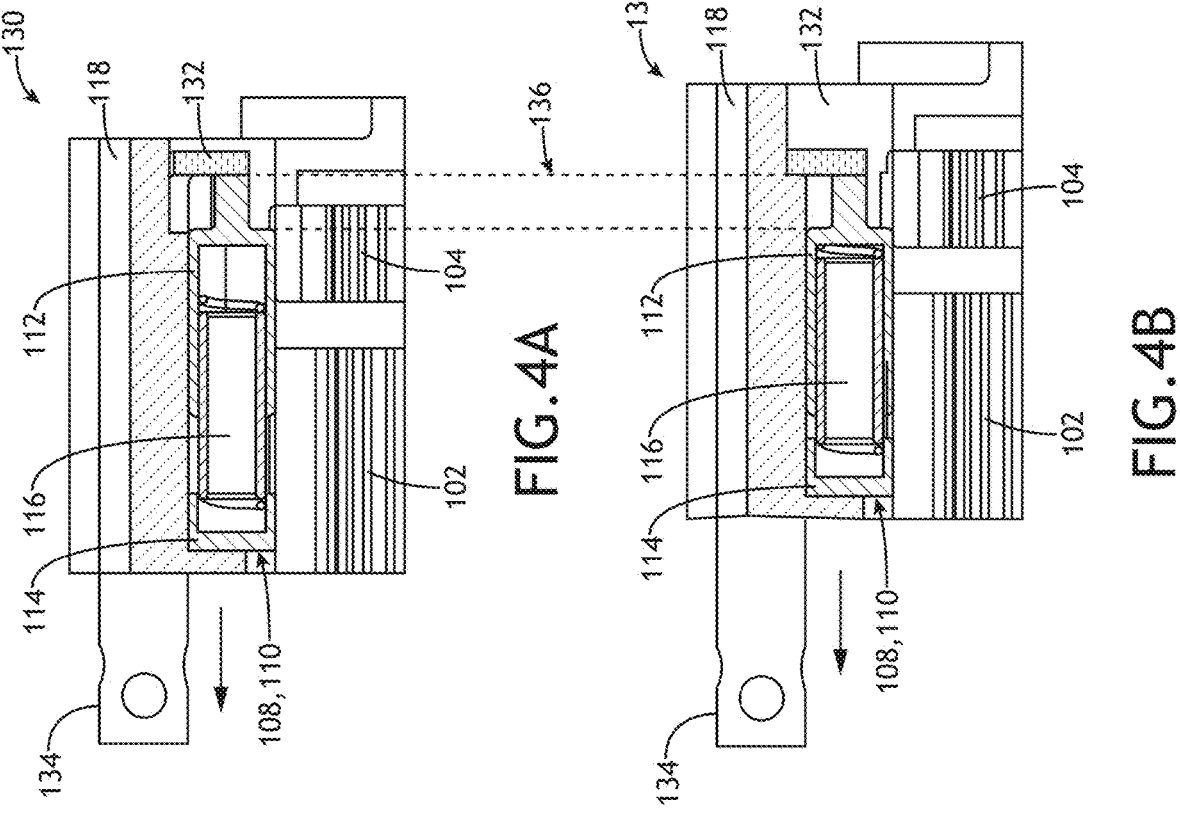
FIG. 4A is a schematic view showing a locked position of the mechanical override mechanism, in accordance with example embodiments of this disclosure.
FIG. 4B is a schematic view showing an unlocked position of the mechanical override mechanism, in accordance with example embodiments of this disclosure.

FIG. 4A illustrates the mechanical override mechanism 130 shown in a locked position corresponding to a coupled state of the ring gears 102, 104. In the locked position, each of the spring-loaded shoot bolts 108, 110 are engaged with each of the first gear 102 and the second gear 104 such that the two gears are coupled to prevent rotation of the second gear 104 relative to the first gear 102. The first and second gears 102, 104 and the mechanical override mechanism 130 are disposed in the housing 118. The mechanical override mechanism 130 further includes a displaceable plate 132 simultaneously engaging one end of each shoot bolt housing 112 opposite the spring cup 114. The displaceable plate 132 interfaces with the shoot bolt housing ends to displace the shoot bolt housings 112 toward their respective spring cup 114. The displaceable plate 132 is coupled to a manual release pin 134 having one end disposed outside of the housing 118.

FIG. 4B illustrates the mechanical override mechanism 130 shown in an unlocked position corresponding to a decoupled state of the ring gears 102, 104. As shown, axially displacing the manual release pin 134 causes the coupled displaceable plate 132 to translate in the housing 118 thereby axially displacing the shoot bolt housings 112 toward their respective spring cup 114 against the spring force of the compression springs 116. The displacement distance illustrated at reference numeral 136 is sufficient to move the shoot bolt housings 112 out of engagement with the scalloped portion of the second ring gear 104, thereby allowing rotation of the second ring gear 104 relative to the stationary first ring gear 102. In a particular conceived example, the unlocked position corresponding to a decoupling of the two gears 102, 104 allows the flight crew to manually return a passenger seat to an upright sitting position, for instance by moving the seat back to upright. When the manual release pin 134 is released, the stored spring force of the compressed springs 116 displaces the shoot bolts housings 112 away from their respective spring cups 114 thereby reengaging the scallops of the second gear 104 to couple the two gears 102, 104.

Figure 5:
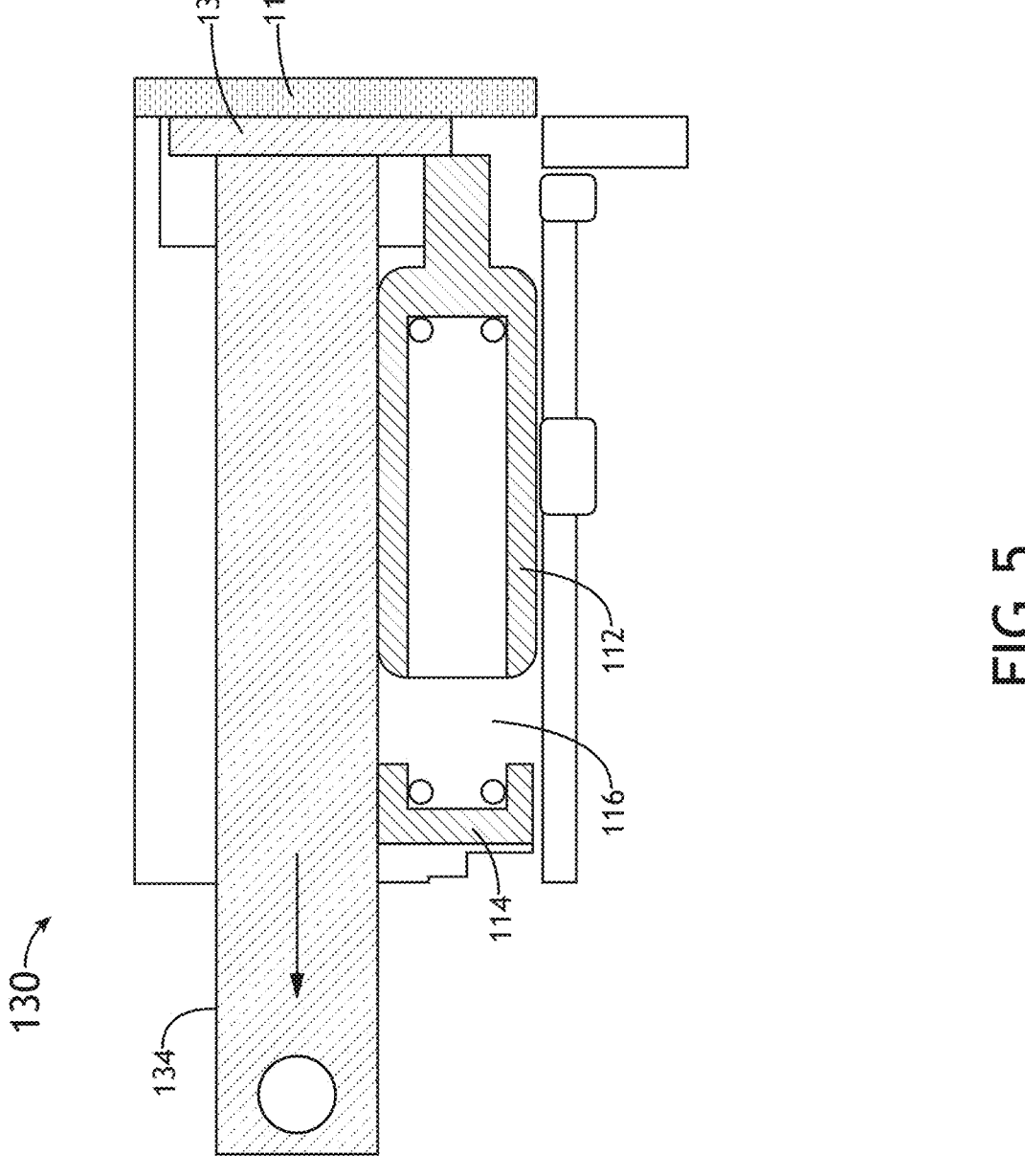
FIG. 5 is a schematic view showing the components of the mechanical override mechanism, in accordance with example embodiments of this disclosure.

FIG. 5 illustrates schematically the configuration of the mechanical override mechanism 130 including the displaceable plate 132 acting on the shoot bolt housing 112 ends to displace the shoot bolts out of engagement with the second gear during a power loss event or malfunction. The exposed end of the manual release pin 134 may be coupled to a lever through cabling such that pulling and holding the lever pulled displaces the manual release pin 134 to the unlocked position, and releasing the lever automatically reengages the two shoot bolts 108, 110.

Figure 6A:
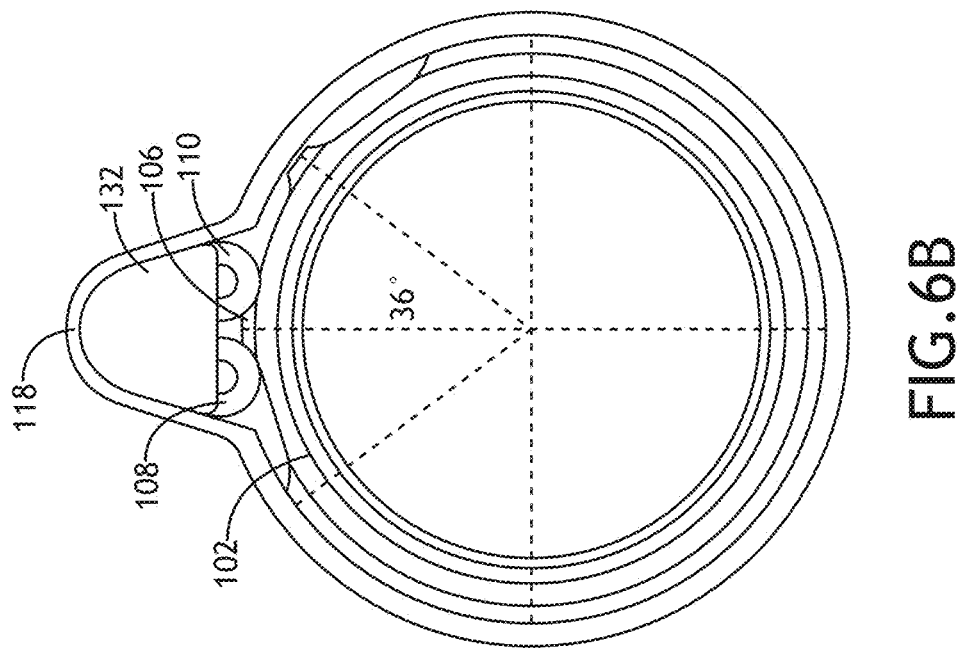
FIG. 6A is a schematic view showing a first engagement position of the spring-loaded shoot bolts of the mechanical override mechanism, in accordance with example embodiments of this disclosure.
Figure 6B:
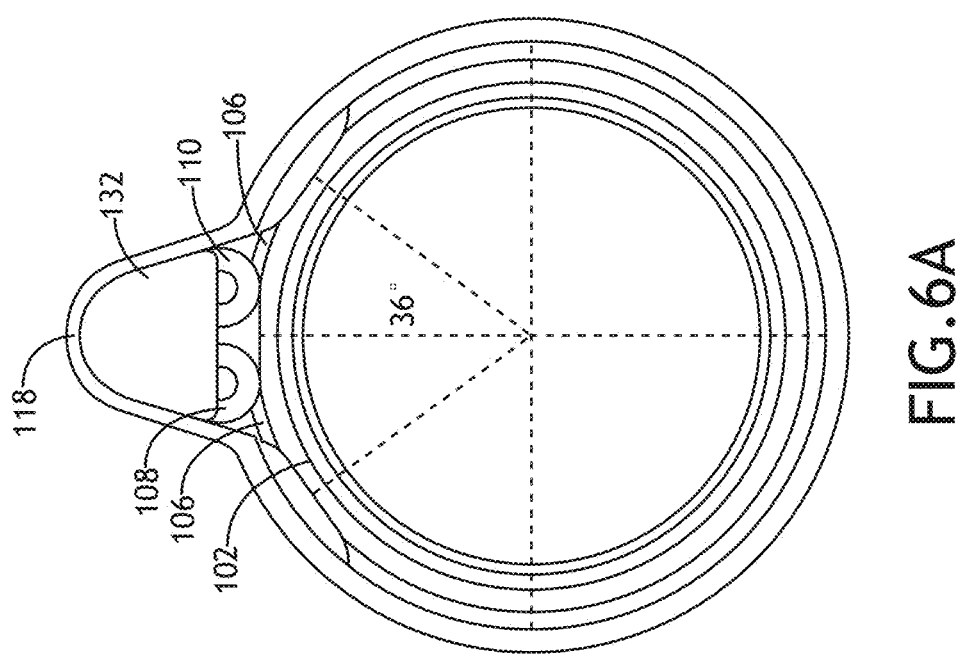
FIG. 6B is a schematic view showing a second engagement position of the spring-loaded shoot bolts of the mechanical override mechanism, in accordance with example embodiments of this disclosure.

FIGS. 6A and 6B illustrate engagement positions of the two spring-loaded shoot bolts 108, 110 considering the scalloped gear configuration shown. FIG. 6A illustrates shoot bolt engagement between adjacent scallops 106 whereas FIG. 6B illustrates shoot bolt engagement acting on opposite sides of a single scallop. In either configuration, the dual shoot bolt engagement ensures coupling and negligible rotational backlash in operation.

Figure 7B:
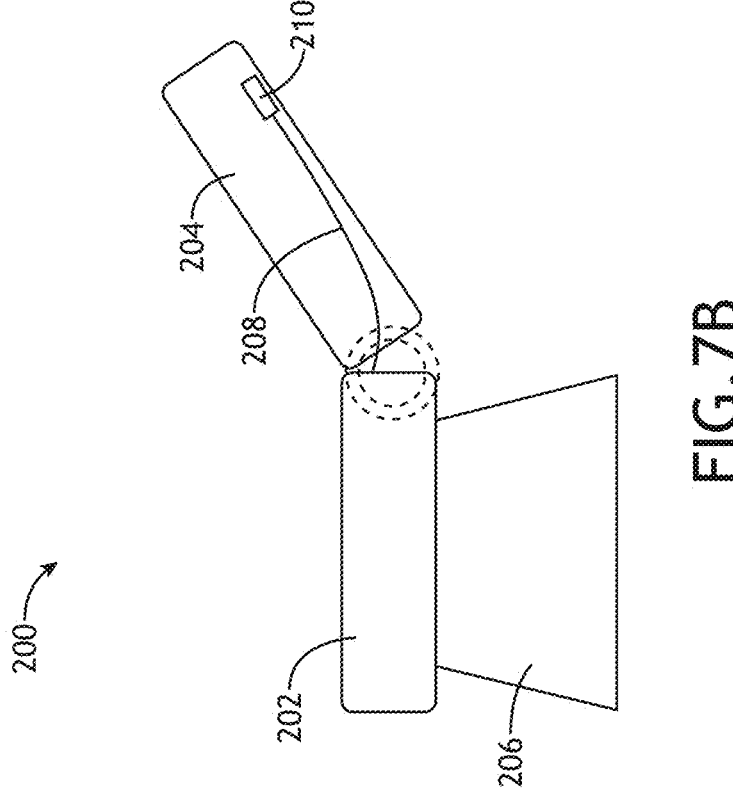
FIG. 7B is a schematic view showing the EMA including the mechanical override mechanism implemented in a reclinable aircraft passenger seat shown in a reclined sitting position, in accordance with example embodiments of this disclosure.
Figure 7A:
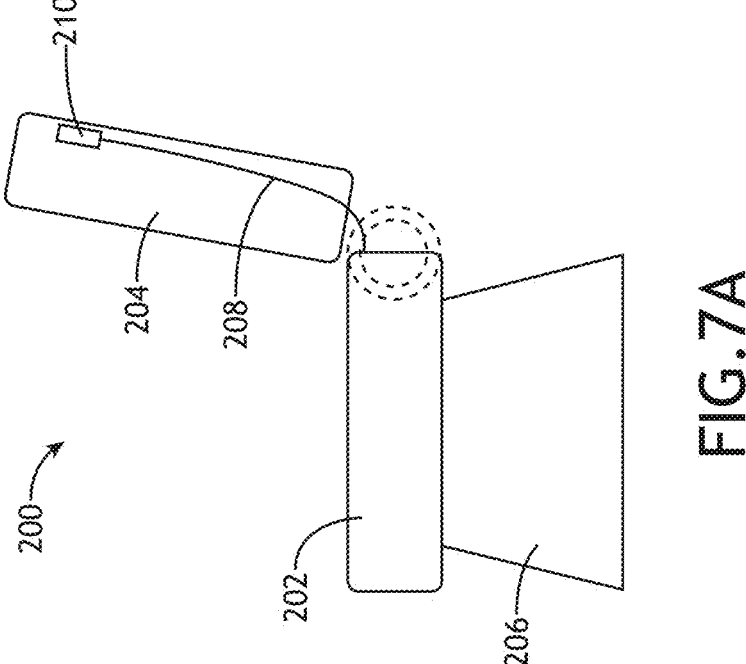
FIG. 7A is a schematic view showing the EMA including the mechanical override mechanism implemented in a reclinable aircraft passenger seat shown in an upright sitting position, in accordance with example embodiments of this disclosure.

FIGS. 7A and 7B illustrate a particular conceived example in which the EMA 100 including the mechanical override feature is implemented in a reclinable aircraft passenger seat. The passenger seat 200, shown schematically, generally includes a seat bottom 202 and a seat back 204. The motion of the seat back 204 between upright and reclined may be controlled by the EMA 100 disposed in the seat base 206. In use, the EMA 100 is operative to drive the gearbox to cause the seat back 204 to change position, e.g., angle. In the event of power loss, motor malfunction or otherwise, the mechanical override mechanism may be actuated to decouple gears of the gearbox to permit relative rotation within the gearbox itself. More specifically, decoupling gears may permit one gear to rotate relative to another, wherein the rotatable gear is coupled to the seat back 204, such that the seat back 204 can be manually rotated free of the 'locked' condition of the motor.

In some embodiments, the manual release pin 134 of the mechanical override mechanism may be coupled at one end to a cable 208, for instance a Bowden cable, coupled at the other end to a lever 210. In use, the lever 210 may be actuated to pull the cable 208 to translate the cable to pull the pin to displace the displaceable plate to simultaneously compress the shoot bolts. When the lever 210 is released, the return force of the compression springs causes the two shoot bolts to reengage automatically thereby connecting the gears to lock relative rotation. Also, in the event of motor failure, the override mechanism can be used to manual adjust the seat back 204 to reclined during flight. The lever 210 may be discretely positioned on the passenger seat 200, for instance on the seat bottom 202 or on the back of the seat back 204, for use by the flight crew but substantially concealed from the view of the passenger. While the manual override mechanism has been described in the context of a seat recline mechanism, the override mechanism can be utilized with any gear assembly benefitting from such an override mechanism.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An electromechanical actuator assembly (EMA), comprising:

a housing;

an electric motor including a rotating drive shaft;

an epicyclic gearbox disposed in the housing and rotationally coupled to the rotating drive shaft, the epicyclic gearbox including a first ring gear and a second ring gear; and a mechanical override mechanism, comprising:

a first spring-loaded shoot bolt disposed in the housing and coupled to the first ring gear;

a second spring-loaded shoot bolt disposed in the housing and coupled to the first ring gear;

a displaceable plate disposed in the housing and engaging one end of each of the first and second spring-loaded shoot bolts; and a manual release pin coupled to the displaceable plate; wherein:

during a powered condition of the EMA, the manual release pin is positioned in a first position such that each of the first and second spring-loaded shoot bolts are coupled to the second ring gear such that the first and second spring-loaded shoot bolts couple the first and second ring gears; and during a power loss condition of the EMA, the manual release pin is moveable to a second position in which the displaceable plate displaces toward the first ring gear to simultaneously displace the first and second spring-loaded shoot bolts toward the first ring gear to decouple the first and second ring gears to permit the second ring gear to be rotated manually relative to the first ring gear.

2. The EMA according to claim 1, wherein each of the first and second spring-loaded shoot bolts comprises:

a shoot bolt housing including a first end engaging the displaceable plate and a second end that is open;

a compression spring having a first end disposed in the second end of the shoot bolt housing; and a spring cup having an open end receiving a second end of the compression spring.

3. The EMA according to claim 2, wherein the spring cup is engaged with the first ring gear.

4. The EMA according to claim 2, wherein:

during the powered condition of the EMA, the compression spring extends to position the shoot bolt housing into engagement with the second gear ring; and during the power loss condition of the EMA, the displacement of the displaceable plate causes the compression spring to be compressed to axially displace the shoot bolt housing toward the first ring gear and out of engagement with the second ring gear.

5. The EMA according to claim 1, wherein:

each of the first and second ring gears are scalloped gears; and the first and second spring-loaded shoot bolts, during the powered condition of the EMA, are relatively positioned to engage a single scallop or two adjacent scallops of the second ring gear.

6. The EMA according to claim 1, wherein:

the first position of the manual release pin corresponds to a locked position in which the first and second ring gears are coupled; and the second position of the manual release pin corresponds to an unlocked position in which the second ring gear is rotatable relative to the first ring gear.

7. The EMA according to claim 1, installed in an aircraft passenger seat, wherein:

the EMA is operable to move a seat back between an upright sitting position and a reclined position;

during the powered condition, the electric motor is operable to move the seat back between the upright and reclined sitting positions through the coupling of the first and second ring gears; and during the power loss condition, the manual release pin is configured to be moved to the second position to allow the seat back to be moved from the reclined sitting position to the upright sitting position by way of the decoupling of the second ring gear from the first ring gear.

8. The EMA according to claim 7, wherein the manual release pin is coupled to a lever position on the aircraft passenger seat.

9. The EMA according to claim 1, wherein:

the manual release pin is displaceable between the first position and the second position in an axial direction of the manual release pin; and the displaceable plate is attached to one end of the manual release pin.

10. An aircraft passenger seat assembly, comprising:

a seat bottom;

a seat back; and an electromechanical actuator assembly (EMA) configured to adjust the seat back between an upright sitting position and a reclined position, the EMA comprising:

a housing;

an electric motor including a rotating drive shaft;

an epicyclic gearbox disposed in the housing and rotationally coupled to the rotating drive shaft, the epicyclic gearbox including a first ring gear and a second ring gear; and a mechanical override mechanism, comprising:

a first spring-loaded shoot bolt disposed in the housing and coupled to the first ring gear;

a second spring-loaded shoot bolt disposed in the housing and coupled to the first ring gear;

a displaceable plate disposed in housing and engaging one end of each of the first and second spring-loaded shoot bolts; and a manual release pin coupled to the displaceable plate;

wherein:

during a powered condition of the EMA, the manual release pin is positioned in a first position such that each of the first and second spring-loaded shoot bolts are coupled to the second ring gear such that the first and second spring-loaded shoot bolts couple the first and second ring gears; and during a power loss condition of the EMA, the manual release pin is moveable to a second position in which the displaceable plate displaces toward the first ring gear to simultaneously displace the first and second spring-loaded shoot bolts toward the first ring gear to decouple the first and second ring gears to permit the second ring gear to be rotated manually relative to the first ring gear.

11. The aircraft passenger seat assembly according to claim 10, wherein each of the first and second spring-loaded shoot bolts comprises:

a shoot bolt housing including a first end engaging the displaceable plate and a second end that is open;

a compression spring having a first end disposed in the second end of the shoot bolt housing; and a spring cup having an open end receiving a second end of the compression spring.

12. The aircraft passenger seat assembly according to claim 11, wherein the spring cup is rotationally engaged with the first ring gear.

13. The aircraft passenger seat assembly according to claim 11, wherein:

during the powered condition of the EMA, the compression spring extends to position the shoot bolt housing into engagement with the second gear ring; and during the power loss condition of the EMA, the displacement of the displaceable plate causes the compression spring to be compressed to axially displace the shoot bolt housing toward the first ring gear and out of engagement with the second ring gear.

14. The aircraft passenger seat assembly according to claim 10, wherein:

each of the first and second ring gears are scalloped gears; and the first and second spring-loaded shoot bolts, during the powered condition of the EMA, are relatively positioned to engage a single scallop or two adjacent scallops of the second ring gear.

15. The aircraft passenger seat assembly according to claim 10, wherein:

the first position of the manual release pin corresponds to a locked position in which the first and second ring gears are coupled; and the second position of the manual release pin corresponds to an unlocked position in which the second ring gear is rotatable relative to the first ring gear.

16. The aircraft passenger seat assembly according to claim 10, wherein:

the EMA is operative to move the seat back between the upright sitting position and the reclined position;

during the powered condition, the electric motor is operative to move the seat back between the upright and reclined sitting positions through the coupling of the first and second ring gears; and during the power loss condition, the manual release pin is configured to be moved to the second position to allow the seat back to be moved from the reclined sitting position to the upright sitting position by way of the decoupling of the second ring gear from the first ring gear.

17. The aircraft passenger seat assembly according to claim 10, wherein the manual release pin is coupled to a lever position on one of the seat back and the seat bottom.

18. A mechanism for releasing a coupling between a first ring gear and a second ring gear, the mechanism comprising:
  at least one spring-loaded shoot bolt including:
    a spring cup coupled to the first ring gear;
    a shoot bolt housing coupled to the second ring gear; and
    a compression spring having a first end engaged in the spring cup and a second end engaged in the shoot bolt housing;
  a displaceable plate engaging an end of the shoot bolt housing opposite the spring cup; and a displaceable pin mounted to the displaceable plate;
  wherein movement of the displaceable pin in a direction of the first ring gear causes the displaceable plate to displace the shoot bolt housing thereby causing the compression spring to compress and the shoot bolt housing to move out of coupling with the second gear thereby allowing the second gear to rotate relative to the first gear.

19. The mechanism according to claim 18, wherein:
  each of the first ring gear and the second ring gear is circumferentially scalloped;
  the spring cup engages between scalloped portions of the first ring gear; and
  the shoot bolt housing engages between scalloped portions of the second ring gear.

20. The mechanism according to claim 18, wherein the mechanism comprises two adjacent spring-loaded shoot bolts.

\* \* \* \* \*